Patented Jan. 14, 1941

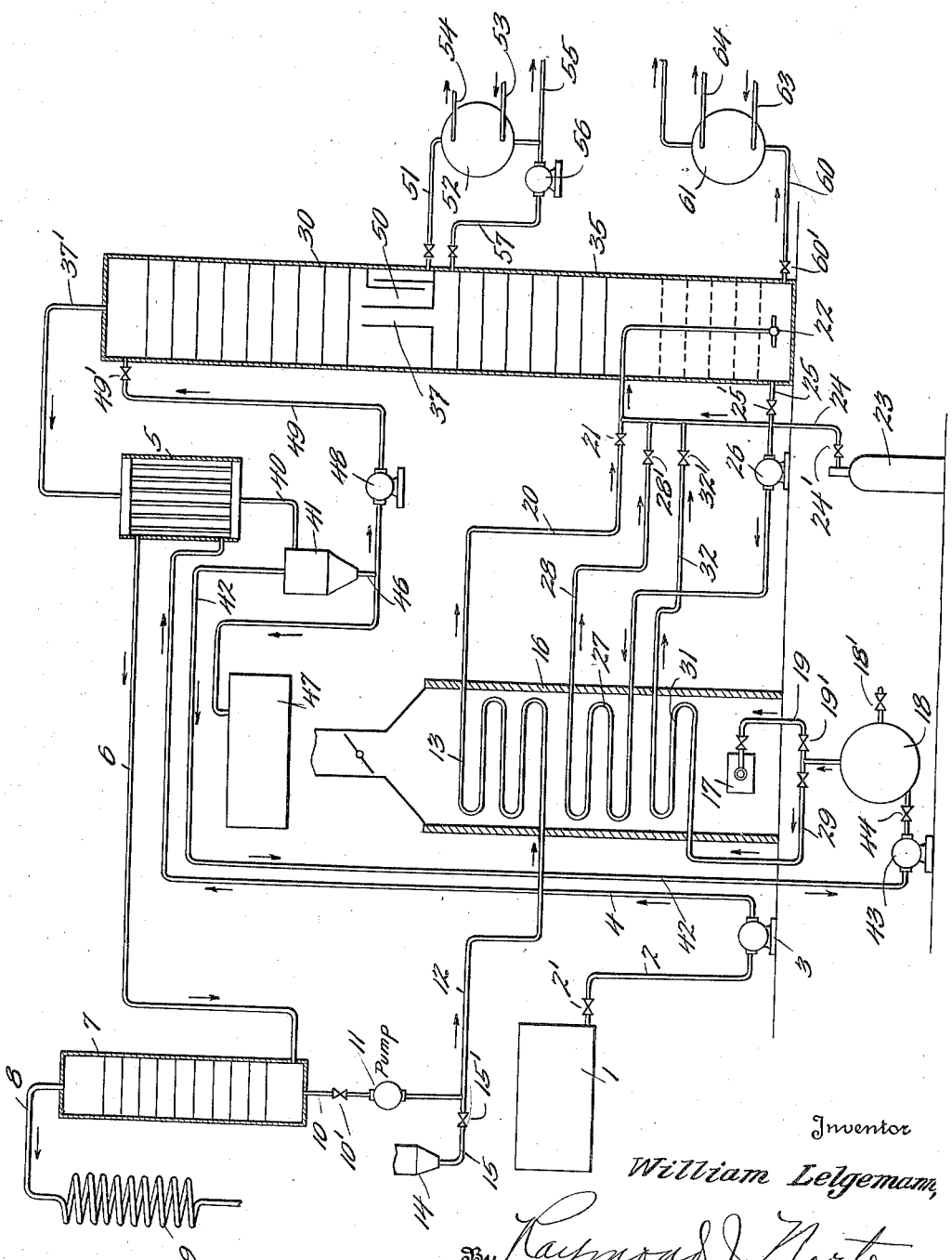

2,228,960

UNITED STATES PATENT OFFICE 2,228,960

METHOD OF TREATING RESINOUS MATERIALS

William Lelgemann, Washington, D. C.

Application September 10, 1936, Serial No. 100,215
Renewed May 23, 1940

4 Claims. (Cl. 260—106)

This invention relates to a method of treating resinous material to produce valuable products therefrom and also to the novel utilization of such products.

More specifically the present invention pertains to a special thermal treatment of resins, oleoresins and the like, that is to say materials containing any predetermined percentage of volatile oils, turpentine and/or pine oils and normally solid resinous products such as colophony.

In the past the natural oleoresins, gums and rosins have been employed largely in the naval stores industries. As is known, such products are produced by scarification of certain trees and the subsequent distillation of the oleoresin or crude gum which is collected. The distillate, oil of turpentine, is employed as a solvent in the paint and other industries. The rosin, similarly, enters the paint industry and is also utilized in other industries, such as paper, soap and the like. However, but little has been done on the development or production of more valuable derivatives from these materials. Such oleoresins, being of pathological derivation, are recoverable from certain species of pines over a long period of time. A method of converting such agricultural products into more valuable chemical products therefore would greatly enhance the economic stability of the naval stores industry by expanding the field for use of its products.

A broad object of the present invention therefore is to so treat such resinous starting materials as to obtain more valuable products therefrom; for example, such as phenolic fractions, terpineol containing fractions or oils, high grade resene like pitches and the like.

Another object is to pyrolytically convert rosin containing material into more valuable products.

Yet another object is to subject resinous starting material to pyrolysis and/or catalysis to produce other materials therefrom.

A still further object is to subject rosin to pyrolysis to produce effective commercial solvents.

Another additional object is to subject rosin like substances to pyrolysis to produce improved pitch like products therefrom.

With these and other equally important objects in view, the invention broadly comprehends the concept of subjecting natural oleoresins or rosin containing material to controlled pyrolysis to convert it into more valuable products. As will be seen more fully hereinafter, the separate products produced are salable as such and in certain circumstances two or more of the conversion products may be compounded to produce novel compositions of eminent efficacy in certain fields. Not only does the potential field of use of such products or combination of products ramify broadly, but also the range of particular fractions and/or residues produced as a result of the conversion may be modified by suitable selective control of the conditions of the conversion reaction.

As broadly illustrative of the invention an oleoresin or gum may be heated to volatilize and recover any residual turpentine while concomitantly liquefying the rosin content. The resulting rosin, if desired in admixture with any predetermined percentage of its natural or added solvent, is then pyrolytically converted. Preferably, as will more fully appear, such conversion is rendered more effective by the use of a catalyzer or reactant having the functional characteristics of nitrosyl chloride. The reaction products may be subjected to fractional separation, preferably fractional condensation, by which predetermined fractions may be recovered, certain of which may be recycled.

In carrying out the process the materials mentioned are reacted in the reaction zone and are then passed, preferably in vapor phase, to a rectifying or fractionating column in which fractions of differential boiling point are condensed and separately recovered. It is found that by operating upon natural rosin and subjecting this to conversion conditions of temperature and pressure, particularly in the presence of nitrosyl chloride, valuable conversion products are produced. For example, with such a treatment, as will be more fully described hereinafter, a phenol fraction representing approximately from 10 to 15% of the charge may be produced. Simultaneously there may be produced a solvent fraction having the characteristics of turpentine and/or pine oil and a heavy pitch or residue.

The several fractions or residues may be treated in any desired manner to purify them and/or to further fractionate them. For many uses the fractions as recovered from the rectifying tower may be employed directly. For example, the phenol fraction may be utilized directly by being compounded with the pitch in admixture with natural rosin or other gum to form improved paints or coating materials for roofing, ship bottoms and the like.

If desired the phenol fraction may be purified by any suitable method, such for example as by azeotropic distillation to recover phenol in substantially pure state for use in the pharmaceutical field or for utilization in the manufacture of artificial resins of the phenol formaldehyde type.

Again, for some purposes, as for example in the solvent extraction of lubricating oils, the phenol fraction recovered according to the present process may be employed directly or with but slight purification. It is to be understood, therefore, that while the process of converting or cracking rosin into more valuable products is specifically described, the invention also comprehends the preliminary or subsequent treatments whereby the immediate fractions recovered may be further processed to clarify or purify them or to further convert them into other valuable derivatives.

In order to enable a more ready comprehension of the underlying principles of the invention, a preferred modification of the process will be described. The apparatus employed is diagrammatically illustrated in the single figure of the accompanying drawing.

It will be appreciated initially that the broad concept of the invention may be embodied in a number of specifically different processes and may be effectuated by utilizing different types of apparatus. That shown and described is given didactically to exemplify the broad principles of the invention.

Essentially the apparatus comprises a heating zone in which the resinous material, such as rosin, is raised to reaction temperature; a reaction zone in which the reaction initiated in the heating zone is continued and accelerated or made more effective by the use of a catalyzer having the characteristics of nitrosyl chloride; and a final rectifying zone in which vaporous products of conversion are scrubbed, fractionated and condensed. As will be appreciated, the character, speed and extent of conversion of the rosin or equivalent oleoresinous material into the ultimate desired end products depends upon the correlation of such factors as the time, temperature and pressure of the reaction, the character of the raw material, the relative quantity of the catalyzer, the presence of catalyst promoters and the like. It will likewise be appreciated that the process may be modified, as for example by utilizing, wherever desirable, suitable heat exchangers to insure maximum thermal efficiency and/or to adapt the process to operation with different types of charging stock.

The apparatus shown in the drawing is illustrative of one method of procedure according to the principles of the invention. As shown, this comprises a closed melting tank 1, provided with suitable heating means, such as a closed steam coil (not shown) in which the rosin or gum is heated to the order of 100° C. more or less for the purpose of liquefying the charge. Tank 1 may be connected by line 2, controlled by valve 2', to the inlet of a charging pump 3. The liquefied charging stock is picked up by pump 3 and forced by way of line 4 through the condenser-heat exchanger 5. In this element the charge is further heated by indirect heat exchange with hot vaporous products of conversion and passes through line 6 to the bottom of flash tower 7. In this element the more volatile fractions of the charge, such for example as turpentine, are vaporized and passed overhead through the vapor line 8 to the condenser 9. Element 9 is shown as a simple coil condenser and it will be understood that where the exigencies of a particular operation so indicate it may be a fractional condenser from which different cuts may be recovered.

The liquid residue collecting in the bottom of tower 7 is passed through the line 10, controlled by valve 10', to the charging pump 11, from which the stock is forced through line 12 to the heating coil 13.

In certain operations it is desirable to employ solid catalytic and/or reaction promoting material, such for example as relatively refractory oxides. Effective materials for this purpose are the oxides of magnesium, strontium, barium and calcium. It is to be understood, however, that refractory oxides of the heavy metals may likewise be employed. Again the reaction may be promoted by utilization of finely divided or powdered metals or alloys, particularly such metals as aluminum, aluminum bronzes and the like. Such promoting material may be carried into the process by being fed into the stream of charging stock, as for example by being admitted from the hopper 14 to the valve 15 and valve 15' to the charging line 12. While the use of such promoting materials in conjunction with a halogenated oxide of nitrogen is found to be effective, it is particularly to be understood that the invention is by no means limited to the employment of such materials as effective results are achieved without the use of such promoters.

The charging stock similarly need not be passed through the preliminary stripping cycle but may be fed directly through line 12 to the heating zone; since in most circumstances the crude supply does contain some valuable higher components, such as turpentine, this preliminary stripping action is recommended.

The heating tube 13 is suitably located with the furnace which is heated by gas burner, which is fed thereto from tank 18 through the line 19 controlled by valve 19'. The heating medium is largely derived from the gaseous products of reaction.

The heating tube 13 is suitably located within the furnace 16 and is heated by the gas burner 17, which latter is fed from the tank 18 through line 19, the latter being controlled by valve 19'. The heating medium employed in the operation is largely derived from the gaseous products of reaction, in a manner more fully to appear. It will be understood that gas, oil or other heating medium from an extraneous source may supplement that developed in the system or may be substituted for it.

The crude material passing through tube section 13 is heated under superatmospheric pressure of the order of 100 lbs. more or less and to elevated temperatures of from 500 to 1000° F., or more and preferably of the order of 950° F. It will be understood that the temperature and pressure employed may vary within relatively wide ranges and will be correlated with respect to the other factors of operation, such as the speed of flow of the crude stock, the quantity and temperature of the nitrosyl chloride, and the proportion of recycle stock utilized.

The hot products from coil 13 are passed through transfer line 20 and pressure control valve 21 to be discharged through the distributor head 22 located in the lower or reaction section of the rectifying column 30. During such flow there is admitted to the hot stream a predetermined quantity of the catalyzer or reactant. As shown, a container 23 for the nitrosyl chloride may be connected through line 24, controlled by valve 24', to the transfer line 20 beyond the pressure valve 21. Small quantities of the nitrosyl chloride or its equivalent may be fed continuously or intermittently into the line 20, thereby intimately contacting with the hot products and accelerating the conversion reactions. Unvaporized products collecting in the base of the tower 30 are drawn off through line 25 and valve 25' and are forced by pump 26 through the heat balancing coil 27. Such reheated products are then passed through the transfer line 28, controlled by valve 28', to be discharged into and admixed with the hot products in the transfer line 20. The quantity of material withdrawn through the line 25 and forced through the coil may be varied widely depending upon the particular reaction temperatures which are desired to be maintained and the extent or degree of conversion desired.

In certain circumstances it is found effective to admix the hot reaction gases with the heated rosin and the nitrosyl chloride. Such hot gases serve effectively to control the temperature of the reaction medium and to improve the evolution of the lighter volatile products from the mass. Thus, as shown in the drawing, gas may be withdrawn from the tank 18 and passed by way of line 29 to the heating coil 31 positioned in the furnace. Preferably this coil is positioned in the lower portion of the furnace so as to act as a screening coil for coils 27 and 13. Gases forced through coil 31 may be passed by way of transfer line 32 and valve 32' to the transfer line 20 to be admixed with the hot products beyond the pressure reduction valve. While such a circulation of gas is effective, and particularly so for the distillation of relatively heavy products, it is particularly to be observed that it is not essential.

As noted above, the highly heated mixture of rosin and nitrosyl chloride or its equivalent, with or without the metal oxides, pass into the lower or reactor section of tower 30. Here, under the action of heat and under the influence of the catalyst, the initial starting material, namely the rosin, is converted into lighter and heavier products. The lighter products, entering the zone of relatively lower pressure, pass upwardly through the tower section 35. During this passage a certain quantity is refluxed and serves to scrub the upflowing gases. Materials uncondensed in the tower section 35 pass into the upper dephlegmator section 36 through the transfer pipe 37. These vapors similarly, in passing upwardly over the plate or bubble tower section, are further fractionally condensed. Prducts uncondensed pass over through the line 37 and are subjected to indirect heat exchange to the liquefied rosin charge, in the manner previously described. During such passage the vaporous products are separated into the gaseous and solvent liquid fractions. After products are discharged from the line 40 and thence into the gas separator 41, the gases pass overhead from the gas separator 41 through the line 42 to the gas transfer 43. Gas compressed herein is forced through valve 44 into the gas pressure storage tank 18, which may be fitted, as shown, with a pressure relief valve 18'. From this element a portion of the gas may be fed through the line 18 to supply fuel for the furnace and a separate portion may be sent through the heating coil to be admixed with the reaction mass.

The liquid solvent fraction condensed in the condenser heat exchange 5 is withdrawn from the bottom of the separator through line 46. As diagrammatically illustrated on the drawing, this liquefied solvent fraction may be passed to the storage tank 47 and a portion may be withdrawn either from the storage tank or directly from the separator by means of the pump 48 and forced continuously, through the line 49, to the upper section of the dephlegmator to serve as a reflux wash.

The intermediate fractions which collect in the pool section 50 of the tower 30 may be withdrawn either intermittently or continuously through line 51 to the water cooler or heat exchanger 52. This element may be cooled by any suitable cooling medium entering pipe 53 and discharging through pipe 54. From the bottom of the condenser 53 the liquefied fraction is withdrawn, a portion of which is passed to storage through line 55 and another portion of which may be picked up by recycle pump 56 and forced through line 57 to the upper portion of section 35 of the tower to serve there as a refluxing medium.

When operating in the manner described using relatively small amounts of nitrosyl chloride, it is found that a very effective conversion of normally solid rosin into valuable new products is effected. From the pool 50 of the upper tower section a phenol fraction is recovered. The recoverable phenol fraction constitutes from 10 to 15% more or less of the charge. Similarly a fraction of light volatile material, having the characteristics of turpentine, is recovered from the top of the tower and collected in receiver 47. This material, called for the sake of a term the solvent fraction, constitutes approximately 35% of the charging stock. From the base of the tower 35 a normally solid pitchy resene like residue may be drawn off through the line 60, controlled by valve 60', and passed through a water cooler or heat exchanger 61. This element may be cooled with water or other suitable cooling medium entering line 63 and discharging through line 64.

It will be understood that the coolers 52 and 61 may be employed to achieve heat economies in the operation by, for example, utilizing the heat evolved therein for preheating the charging stock. In typical operations the pitch like or tary residue recovered from the bottom of the tower constitutes approximately 50% of the charge. It will be understood that the relative percentages of the three fractions mentioned will vary considerably, depending upon the extent of heating and the temperature of the operation. With particular reference to the intermediate or phenol fraction, it will be understood that this collects in the base of the tower section 30 as an oily compound which contains from 15 to 20% or more of phenol. This product may be withdrawn and used directly as such for certain purposes, or may be subjected to any suitable type of purification or clarification to separately recover the phenol therefrom and the other oily constituents.

As indicated hereinbefore, the present invention contemplates also the preparation of novel products produced by combining the raw material and certain of the fractions produced in the process. For example, waterproofing coating compositions suitable for use in a variety of fields may be prepared by combining the residue drawn off from line 60 with certain proportions of natural rosin. Such combining is preferably done while these normally solid materials are in the liquid state. For this purpose, therefore, material may be drawn off through line 60 without passing through the cooler 61 and may be combined and admixed directly with hot liquid rosin withdrawn, for example, from the drainage line leading from line 10.

Such compositions, when cooled and set, are characterized by a resistance to cracking and erosion and are particularly well suited for employment as roof coverings or for the coating or impregnation of wood, papers, textiles and the like. For certain purposes, as for example where a fungicidal or insecticidal effect is desired in the plastic, predetermined proportions of the crude phenol distillate or of partially clarified phenol distillate may be admixed with the pitchy residue and the rosin. It will be understood that by varying the relative percentages of the pitchy residue and the rosin the physical characteristics of such plastics may be widely modified to adapt them to different specific uses. It will be understood also that such compositions may be used in admixture with aggregates or fillers, such as cinders, shale, expanded mica and the like, to prepare building or other units. The material, with or without finely divided fillers, may be employed as a mastic for building or road purposes. Since such plastics are comprised in a large part of materials which have already undergone heat treatment and distillation they are thus comprised of very low boiling point constituents; in other words, such products may be employed for building, road surfacing and coating where elevated atmospheric temperatures are encountered.

It will also be appreciated that plastics comprised basically of rosin and cracked rosin residue may be formulated with other materials to adapt the product to a wide field of use. As a typical example paint materials, particularly effective for the protection of ships' bottoms, or other similar marine structures, may be prepared by compounding approximately 40% of rosin, 40% of the residue from the rosin cracking plant, approximately 4% of asphalt, substantially 6.6% of rubber and about 9.4% of the phenol distillate. These materials may be homogeneously admixed while in the hot fluid state. The rubber component, which adds tenacity and plasticity to the product, may be incorporated by utilizing rubber latex or emulsions of solvent rubber, or rubber solutions derived for example from scrap rubber. In this respect it is to be noted that the high solvent fractions obtained in the process may advantageously be employed. The phenol utilized, as noted above, may be the crude phenol distillate recovered from the process or may be partially purified. When such a homogeneous plastic is prepared and utilized, for example, for protection of ships' bottoms, pilings and the like, it will be appreciated that the phenol content is made available for bactericidal or insecticidal action by slow leaching from the plastic mass. When desired adjuvants may be incorporated in the paint, which modify the partition coefficient of the phenol to control the degree of leaching.

Again, excellent roofing materials, characterized by a resistance to checking and cracking and a low penetration even at relatively elevated temperatures, may be prepared by compounding approximately 45% of rosin, 45% of tar, 6% of rubber, 2% of asphalt and 2% of phenol. The compositions indicated above are given as merely representative of the type of products which may be produced by combining several fractions produced by the present process with the charging stock, namely the rosin. The particular percentages may be varied within wide ranges, depending upon the particular type of product to be produced.

It is clearly to be understood that the present invention comprehends broadly the concept of producing valuable products or derivatives from rosin by cracking the rosin under suitable temperature conditions. In the preferred form of the process the reactions are accelerated and the yields improved by utilizing catalytically acting materials having the functional characteristics of nitrosyl chloride. While a process has been described for the production of a "solvent fraction," a phenol distillate and a pitchy residue, it will be understood that by proper control of the cracking or reforming temperature and the thermal conditions in the tower, other fractions may be produced. Thus the invention directly comprehends the production of material such as turpentine and pine oil by pyrolysis of rosin. As will be appreciated, the separation of turpentine and pine oil fractions may be effected either by proper temperature control in the main tower or by the use of a supplemental dephlegmator or fractionator whereby constituents having a boiling point below approximately 180° C., i. e. alpha pinene, beta pinene, di pinene and the like, may be recovered separately from the pine oil constituents, the latter fraction having a boiling point above approximately 200° C. and containing constituents such as alpha turpineol, borneol, fenchyl alcohol and the like. In other words, by proper control the true turpentine fraction may be separated from the true pine oil fraction.

The precise mechanism by which such high yields of light valuable constituents are secured from rosin or gum rosin is not completely understood. The starting material is of course a mixture of highly complex compounds. It is quite apparent, however, that the process involves a scission and/or molecular rearrangement effected pyrolytically and enhanced or controlled by a catalytically acting substance. The process is to be clearly distinguished from typical methods of wood distillation in which, in addition to the distillation of natural fractions of rosin, there is a decomposition of the constituents of the wood. The present method, on the other hand, relates to the treatment of rosin to chemically convert or rearrange the original constituents into a different product and is comparable in this respect to the cracking (rather than the distillation) of petroleum oils.

While preferred modifications of the invention have been described, it is to be understood that these are given as illustrative of the underlying principles and not as indicating the exclusive methods of effectuating the invention. The invention therefore is to be considered not limited to the precise treatments described, except as such limitations are clearly imposed by the appended claims.

I claim:

1. A method of treating rosin to recover therefrom lighter constituents having the characteristics of turpentine and pine oil which comprises subjecting the rosin substance to cracking conditions of temperature and pressure and in the presence of a halogenated oxide of nitrogen, then distilling the products of conversion and condensing and recovering fractions having the characteristics of turpentine and pine oil.

2. A method of treating rosin to obtain valuable products therefrom which comprises heating said substances to a temperature of the order of 180° C. to evolve the natural turpentine constituents thereof, separately condensing and recovering said constituents; passing the preheated liquid rosin through a cracking zone and there heating it to cracking temperatures of the order of 500° C. and in the presence of nitrosyl chloride; passing the products of conversion to a reduced pressure distillation zone and there evolving lighter constituents, fractionally condensing and removing from the distillation zone a fraction rich in phenolic bodies, fractionally condensing and removing from another section of the zone a fraction rich in turpentine like constituents, and removing from the bottom of said zone a rosin pitch.

3. A method of treating rosin to recover valuable products therefrom which comprises heating natural rosin at temperatures of the order of 500° C. and at superatmospheric pressures in the presence of nitrosyl chloride and selectively condensing the volatile products of conversion.

4. A method of treating rosin to recover valuable products therefrom which comprises continuously heating a stream of rosin to a temperature of the order of 500° C., at superatmospheric pressures of the order of one hundred pounds and in the presence of nitrosyl chloride, and continuously distilling and selectively condensing volatile products of conversion.

WILLIAM LELGEMANN.